US012694020B1

(12) United States Patent
Sales et al.

(10) Patent No.: US 12,694,020 B1
(45) Date of Patent: Jul. 28, 2026

(54) EXECUTION SPEED AND EFFICACY OF SEMANTIC QUERIES BASED ON SELECTION OF RELEVANT DOCUMENT SUBSETS

(71) Applicant: Everlaw, Inc., Oakland, CA (US)

(72) Inventors: Mark Sales, Castro Valley, CA (US); Ayush Sharma, Berkeley, CA (US); Arsal Imtiaz, Oakland, CA (US); Dean Kim, Oakland, CA (US); Joseph Kijewski, Berkeley, CA (US); Ram Subbaroyan, Berkeley, CA (US)

(73) Assignee: Everlaw, Inc., Oakland, CA (US)

( * ) Notice: Subject to any disclaimer, the term of this patent is extended or adjusted under 35 U.S.C. 154(b) by 0 days.

(21) Appl. No.: 19/074,026

(22) Filed: Mar. 7, 2025

(51) Int. Cl.
| | |
|---|---|
| *G06F 16/242* | (2019.01) |
| *G06F 16/2452* | (2019.01) |
| *G06F 16/2453* | (2019.01) |
| *G06F 40/30* | (2020.01) |

(52) U.S. Cl.
CPC ...... *G06F 16/243* (2019.01); *G06F 16/24522* (2019.01); *G06F 16/2453* (2019.01); *G06F 40/30* (2020.01)

(58) Field of Classification Search
CPC ............. G06F 16/243; G06F 16/24522; G06F 16/2453; G06F 40/30
USPC ........................................................ 707/754
See application file for complete search history.

(56) References Cited

U.S. PATENT DOCUMENTS

| | | | | |
|---|---|---|---|---|
| 2025/0086170 A1* | 3/2025 | Rumade | .............. | G06F 16/2237 |
| 2025/0335486 A1* | 10/2025 | Tsitsulin | ............. | G06F 16/3329 |

OTHER PUBLICATIONS

"Named-entity Recognition" Wikipedia; 7 pages, accessed Mar. 7, 2025.
"Vector Embeddings" https://platform.openai.com; 7 pages, accessed Mar. 7, 2025.
"Vector Search vs Semantic Search"; www.timescale.com; 7 pages; accessed Mar. 7, 2025.
"Vector Database" Wikipedia; 8 pages, accessed Mar. 7, 2025.
Semantic Search vs. Syntactic Search: Understanding the Differences and Synergies Ajay, Verma, 17 pages, accessed Mar. 7, 2025.

* cited by examiner

*Primary Examiner* — Cam Y T Truong
(74) *Attorney, Agent, or Firm* — KellDann Law PLLC; Scott M. Kelly

(57) ABSTRACT
Aspects of the invention may comprise a method for improving execution speed of a semantic query on a database by executing the semantic query on a subset of relevant documents in the database. The method may provide for improving execution speed without sacrificing accuracy because the subset of documents comprises documents relevant to the semantic query. Aspects of the invention may further provide for identifying key concepts in a semantic query and generating a filter query based on the identified key concepts. The filter query may be used to select the subset of relevant documents. Aspects further provide for generating one or more keyword queries based on a key concept and at least one search operator. The filter query may incorporate at least one keyword query. Aspects of the invention further comprise implementing entity recognition, metadata filtering, and essentialness to improve the selected subset.

20 Claims, 6 Drawing Sheets

107

109

105

NETWORK

103

111

117

PROCESSOR

NETWORK INTERFACE

RAM

ROM
115

INPUT/OUTPUT

119

120

113

MEMORY 121

OPERATING SYSTEM

123

CONTROL LOGIC

125

101

APPLICATION SOFTWARE

127

Method 200

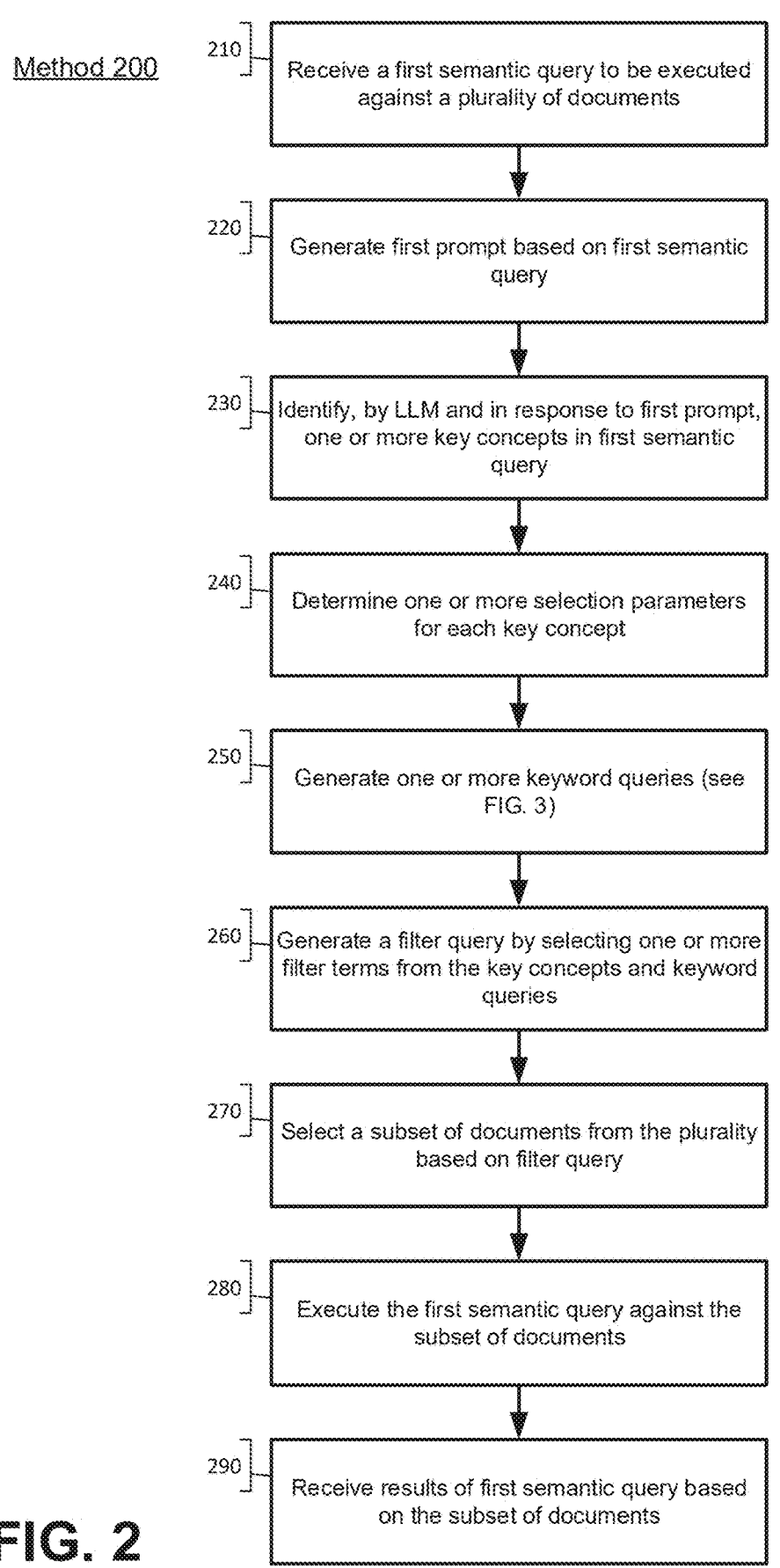

210  Receive a first semantic query to be executed against a plurality of documents 220  Generate first prompt based on first semantic query 230  Identify, by LLM and in response to first prompt, one or more key concepts in first semantic query 240  Determine one or more selection parameters for each key concept 250  Generate one or more keyword queries (see FIG. 3)

260  Generate a filter query by selecting one or more filter terms from the key concepts and keyword queries 270  Select a subset of documents from the plurality based on filter query 280  Execute the first semantic query against the subset of documents 290  Receive results of first semantic query based on the subset of documents

FIG. 2

EXECUTION SPEED AND EFFICACY OF SEMANTIC QUERIES BASED ON SELECTION OF RELEVANT DOCUMENT SUBSETS

FIELD

Aspects described herein generally relate to a method for improving execution speed and efficacy of a semantic (e.g., natural language) query over a document corpus by selecting a subset of relevant documents, executing the semantic query over the subset, and returning results of the semantic query based on the subset. Aspects further provide construction of a filter query to select subsets of relevant documents and integrating entity recognition alongside the method.

BACKGROUND

Traditionally, searching a database required a user not just understand what the user was looking for, but also understand how the database was organized and how to construct a database query (e.g., executable database statement, such as SQL) to select relevant documents. Because of this, searching a database required a user to be trained in how the database was organized and in the corresponding database language. Not only did this require specialized training, but depending on the size of the database or the type of document stored, searching the database was difficult and time-consuming. As a result, a user attempting to answer a question from a database first had to identify a relevant subset of documents in the database, which required translating a question into a traditional database query, selecting a subset of documents from the database with the query, and potentially iterating on the query one or more times to improve the subset. Second, the user had to manually review documents in the subset to be able to answer the question.

By contrast, a semantic query may save the user significant time and energy. A semantic query is a natural language statement which can be executed on a database, which the computer interprets to search within the database even though the query is not in a computer search structure. A semantic query allows a user to express a question about the database without being trained on the database language. This also includes complex questions not answerable by traditional database queries alone. As a result, semantic queries can be very useful when a user is searching a large database with numerous documents.

However, semantic queries are both time and resource intensive. Users often expect search queries to be executed very quickly. For example, Google™ can execute simple keyword queries and return a list of thousands of URLs in less than a second. By contrast, a semantic query on GPT-4™ can easily take well over a minute: a length of time many users would find unreasonable. As a result, for users to use semantic queries, semantic queries must be able to execute more quickly.

One major driver for the length of time is a size of a database: a semantic query executing against a larger database will likely take longer to execute. However, the larger a database is, the more useful a semantic query becomes because it may save a user from manually reviewing documents. In addition, a larger database has a higher the chance of false positives: documents with embeddings that superficially match the semantic query, but would not be considered relevant by a human. This can make semantic queries less accurate even when, paradoxically, the database may comprise the relevant documents. In summary, the exact situation in which a semantic query would be most useful—when searching a large corpus comprised of numerous documents of different types—is also the situation when semantic queries become the most difficult to use.

This scenario especially affects fields with large databases comprising a variety of different document types, such as the field of electronic discovery. Electronic discovery ("e-discovery") refers to identification, production, and review of documents and/or files during a lawsuit. E-discovery documents often comprise many different document types, such as Microsoft Word, PDF, media files, engineering diagrams, and more. Many of these document types also require large amounts of storage. As the database gets larger, it becomes more and more difficult for a human user to identify all of the relevant documents in the database and review each relevant document. Semantic queries would be particularly useful for answering questions in e-discovery databases, but may also be particularly slow or inaccurate due to the reasons discussed above.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

The following aspects describe an improvement to executing semantic search queries against (e.g., on) a database, especially with regards to large databases comprising a corpus of documents. Although semantic search queries allow for expression of complex ideas in natural language, executing semantic queries may be heavily resource- and time-intensive, and become even more so as the size of the database increases. Users expect search queries to execute quickly, even semantic queries. Users may also want to execute multiple queries in a row, refining subsequent queries based on results of a previous query. However, a semantic query which takes too long to execute may no longer be useful to a user, forcing the user to manually review documents instead. Executing the semantic query against a smaller subset of documents in the corpus may improve execution speed, but can exclude potentially relevant documents.

Aspects described below comprise a method to improve execution speed of semantic queries by identifying key concepts in a semantic query, generating a database language filter query to select a subset of relevant documents, and executing the semantic query against the subset of relevant documents. Because the method selects a subset of documents based on key concepts in the semantic query, the subset comprises documents which are likely relevant to the semantic query while also being smaller than the corpus. As a result, the semantic query can be executed more quickly without sacrificing accuracy by excluding potentially relevant documents. This makes semantic queries more useful, especially when working with large databases.

To overcome limitations in the prior art described above, and to overcome other limitations that will be apparent upon reading and understanding the present specification, aspects described herein are directed to a computer-implemented method to improve execution speed of a semantic query by executing the semantic query a subset of relevant documents from a corpus. The method begins with receiving a first semantic query to be executed against a document corpus, wherein the document corpus comprises a plurality of documents. Based on the first semantic query, a first prompt is generated, wherein the first prompt is configured to direct a large language model (LLM) to identify one or more key concepts in the first semantic query. Then, using the LLM and in response to the first prompt, one or more key concepts in the first semantic query are identified. The method further comprises determining, for each of the key concepts, one or more selection parameters based on the document corpus. The selection parameters comprise at least a count parameter, wherein the count parameter is based on a frequency of each key concept in the document corpus. The method further comprises generating one or more keyword queries, wherein a keyword query is based on at least one key concept and at least one search operator, and then determining one or more selection parameters for each of the keyword queries. The method further comprises generating a filter query by selecting one or more filter terms from the key concepts and the keyword queries, based at least in part on the count parameter corresponding to each respective filter term. The filter query is used to select a subset of documents in the document corpus. The first semantic query is then executed against the subset of documents.

The method further comprises generating the filter query by selecting one or more filter terms for the filter query, determining a count parameter corresponding to the filter query, and, based on the count parameter not exceeding a target count, selecting one or more additional filter terms for the filter query. The count parameter for a given key concept is a number of documents in the document corpus comprising the given key concept. The method further comprises generating a keyword query based on a first key concept by determining, based on the count parameter associated with the first key concept, that the count parameter exceeds a first threshold. Then, a second key concept is then selected from the key concepts, a second key concept; and the first key concept and second key concept are connected with a search operator.

The method further comprises wherein the selection parameters comprise an essentialness parameter. Selecting the one or more filter terms for the filter query is further based on comparing the essentialness parameter corresponding to each respective filter term. Based on the essentialness parameter for a respective filter term indicating that the respective filter term has a high degree of essentialness, selecting the respective filter term. Identifying the key concepts to further include the essentialness parameter comprises predicting, using the LLM, and a likelihood that a first key concept corresponds to a first metadata field in the document corpus. Based on a high likelihood that the first key concept corresponds to the first metadata field, the method further comprises generating, using the LLM, a first metadata query corresponding to the first key concept and the first metadata field, and including the first metadata query in the key concepts.

Identifying the one or more key concepts in the first semantic query further comprises identifying, by the LLM, a first term in the first semantic query, determining that the first term corresponds to a first entity level concept, and including the first entity level concept in the key concepts. The entity level concept may comprise a plurality of key concepts referring to a same entity. The entity level concept is a person.

The method further comprises wherein a first keyword query based on a first key concept is configured to exclude one or more negative keywords. A negative keyword is a first keyword appearing in one or more documents in the document corpus which the first key concept also appears in and wherein the first keyword is not relevant to the first semantic query. A search operator comprises one of: an AND operator, an OR operator, a NOT operator, or proximity operator.

According to other aspects described herein, a non-transitory computer readable medium having instructions stored thereon that, when executed by one or more processors, may cause the one or more processors to perform steps to execute the methods described above. According to further aspects described herein, a computing device, comprising one or more processors and memory storing instructions that, when executed by the one or more processors, cause the computing device to execute the methods described above.

BRIEF DESCRIPTION OF DRAWINGS

A more complete understanding of aspects described herein and the advantages thereof may be acquired by referring to the following description in consideration of the accompanying drawings, in which like reference numbers indicate like features, and wherein:

FIG. 2 depicts a method for improving execution speed of a semantic query against a relevant subset of documents, according to aspects described herein;

DETAILED DESCRIPTION

Figure 1A:
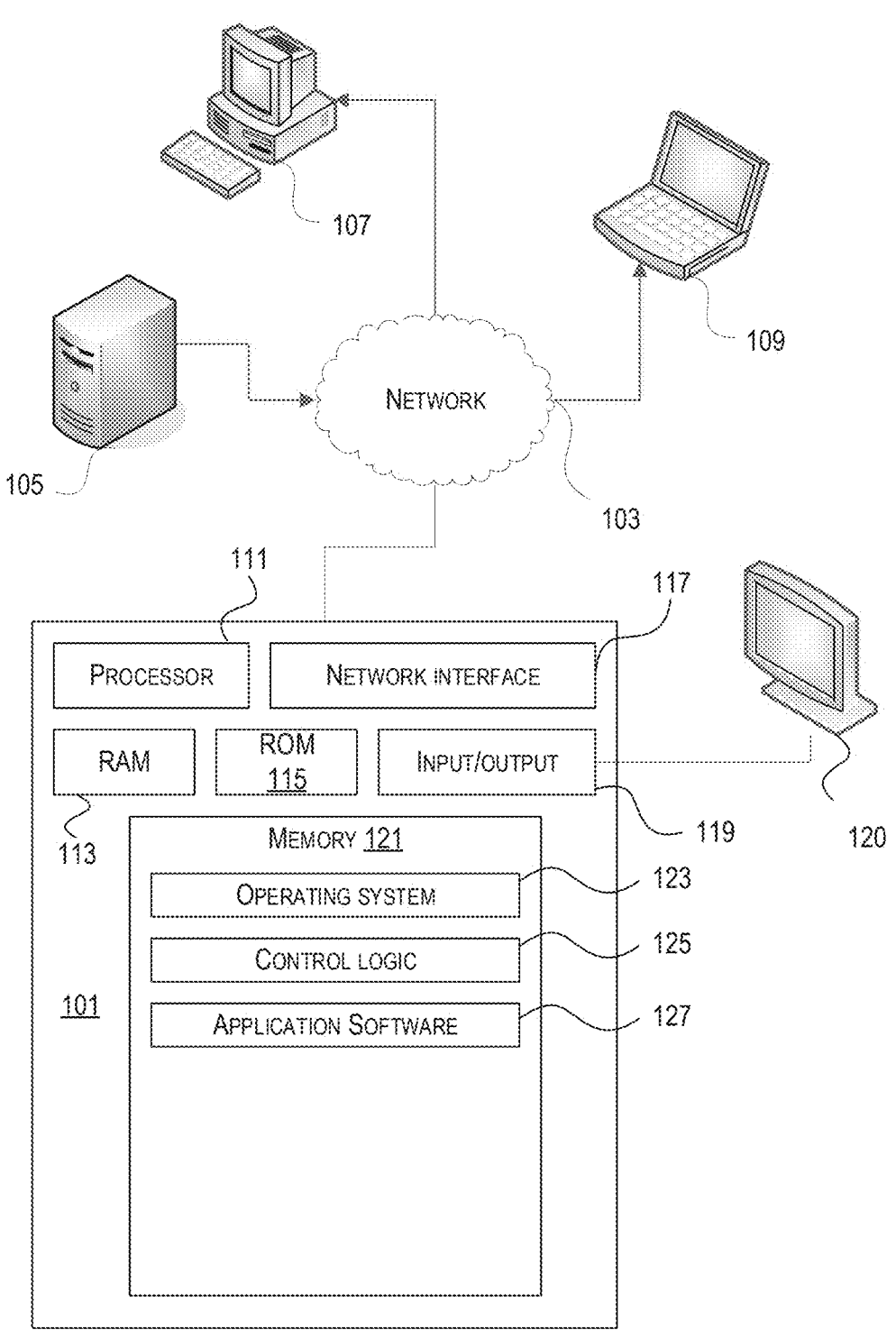
FIG. 1A depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, the following description addresses improvements relating to executing a semantic query over a database. A semantic query may be written in natural language, allowing a user to express complex concepts or relationships without requiring the user to write the query in a database language (i.e., SQL). However, executing a semantic query may be a time-consuming and resource-intensive process, made even more so depending on the size of the corresponding database. A semantic query executing against (e.g., running on) a large database may be much slower than the same semantic query executing on a smaller database or a subset selected from a large database. However, selecting a subset that does not exclude relevant documents may be difficult. Furthermore, requiring the user to select a subset of relevant documents may defeat the purpose of a semantic query because doing so requires the user to write a database query to select the subset: exactly the task that a semantic query is supposed to replace.

Improving execution speed of a semantic query may be especially valuable in fields with large database comprising a variety of different document types, such as in the field of e-discovery. E-discovery platforms may also further leverage the document corpus, referring to documents comprising the database, to provide further features than merely storing documents. The document corpus may act as a pool of data that can be queried (e.g., providing for searching of document contents and metadata fields) and indexed and/or organized using database optimization techniques such as clustering, vectorization, predictive coding, and/or others. All of these methods may improve execution speed of semantic queries, especially based on aspects described herein.

Described herein is a method for identifying, by an LLM, key concepts in the semantic query, building a filter query (e.g., database query) based on the identified key concepts to select a subset of documents in the database, and executing the semantic query over the selected subset of documents. Because the filter query is based on the key concepts identified from the semantic query, the filter query is likely to select relevant documents from the plurality of documents in the database. When the semantic query is executed against the subset of documents, the semantic query may execute more quickly over the subset of documents compared to the whole database while still maintaining accuracy and thoroughness.

Aspects herein improve the functioning of computers by improving the speed of semantic queries on computers without sacrificing accuracy by selecting a subset of documents relevant to the semantic query. Aspects further improve selection of the subset of documents and exclusion of irrelevant documents. Aspects herein may be used alongside other search improvement techniques, such as embedding, vector searches, and/or others.

FIG. 1 illustrates one example of a network architecture and data processing devices that may be used to implement one or more illustrative aspects described herein. Various network nodes 101, 105, 107, and 109 may be interconnected via a wide area network (WAN) 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data-attributable to a single entity-which resides across all physical networks.

The components may include data server 105 and client computers 107, 109. Data server 105 provides overall access, control and administration of databases and control software for performing one or more illustrative aspects described herein. Data server 105 may be connected to a second server through which users interact with and obtain data as requested. Alternatively, data server 105 may act or include the functionality of the second server itself and be directly connected to the Internet. Data server 105 may be connected to the second server through the network 103 (e.g., the Internet), via direct or indirect connection, or via some other network. Users may interact with the data server 105 using remote computers 107, 109, e.g., using a web browser to connect to the data server 105 via one or more externally exposed web sites hosted by web server 105. Client computers 107, 109 may be used in concert with data server 105 to access data stored therein, or may be used for other purposes. For example, from client device 107 a user may access the second server using an Internet browser, as is known in the art, or by executing a software application that communicates with the second server and/or data server 105 over a computer network (such as the Internet).

Servers and applications may be combined on the same physical machines, and retain separate virtual or logical addresses, or may reside on separate physical machines. FIG. 1A illustrates just one example of a network architecture that may be used, and those of skill in the art will appreciate that the specific network architecture and data processing devices used may vary, and are secondary to the functionality that they provide, as further described herein. For example, services provided by web server 103 and data server 105 may be combined on a single server.

Each component 105, 107, 109 may be any type of known computer, server, or data processing device, e.g., laptops, desktops, tablets, smartphones, servers, micro-PCs, etc. Data server 105, e.g., may include a processor 111 controlling overall operation of the data server 105. Data server 105 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 101, control logic 125 for instructing data server 105 to perform aspects described herein, and other application software 127 providing secondary, support, and/or other functionality which may or may not be used in conjunction with other aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein. That is, the data can be stored in a single database, or separated into different logical, virtual, or physical databases, depending on system design. Devices 105, 107, 109 may have similar or different architecture as described with respect to device 101. Those of skill in the art will appreciate that the functionality of data processing device 101 (or device 105, 107, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Figure 1B:
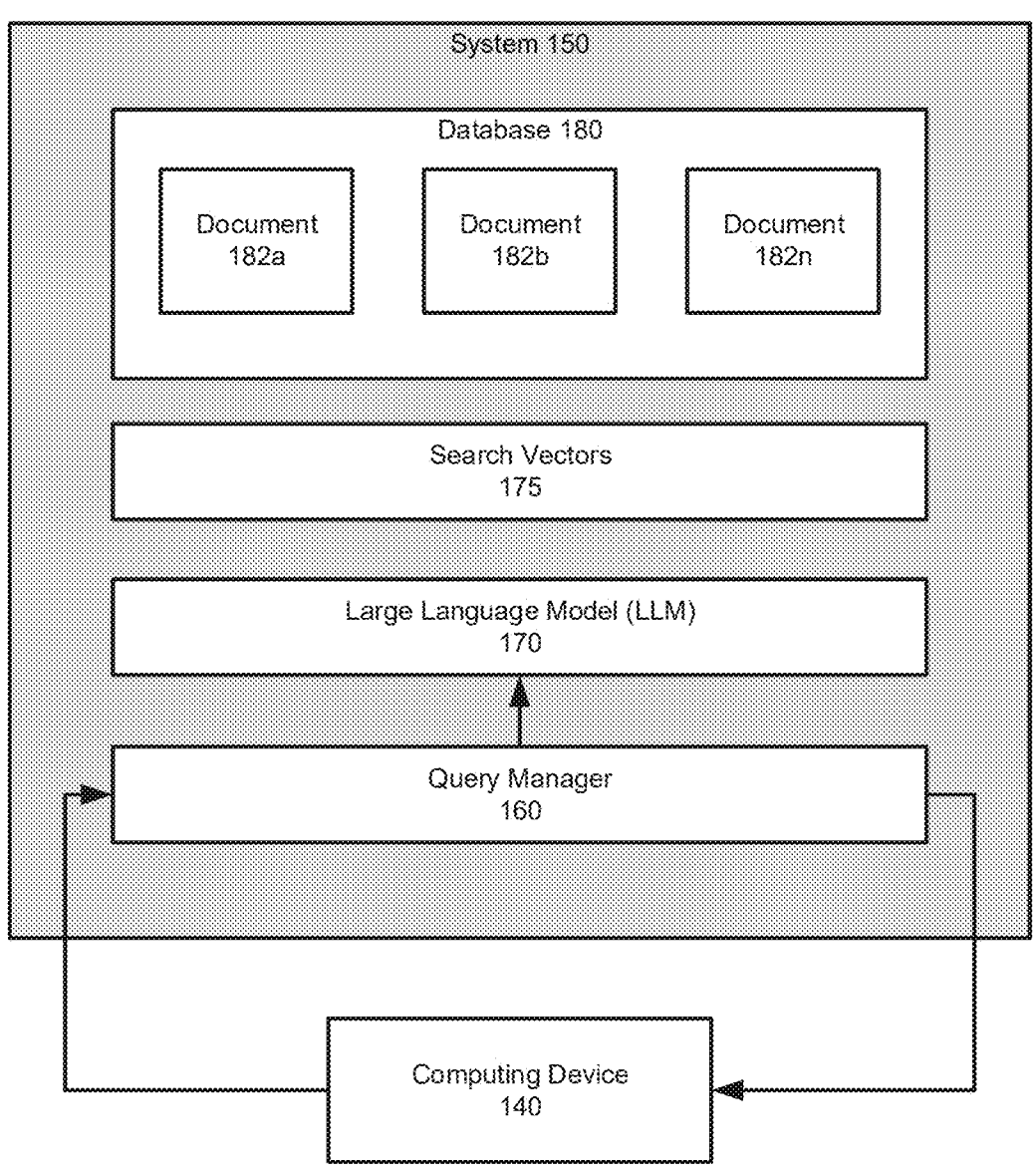
FIG. 1B depicts an example of a networked database system.

FIG. 1B depicts an example of a networked database system. System 150 is a networked system of one or more data servers (e.g., computing devices 101 or 105 as depicted in FIG. 1A). System 150 may be operated and/or controlled by a single party. As depicted in FIG. 1B, components of system 150 are integrated into system 150. Additionally or alternatively, one or more components of system 150 may be external to system 150 and operated and/or controlled by third parties. For example, large language model (LLM) 170 may be external to system 150 and operated by a third party. In this example, LLM 170 would be connected to system 150 over network 103 and may send or receive queries to system 150. In another example, search vectors 175 may be generated and/or managed by a third party semantic embedder. For the purposes of the following description, system 150 will be as depicted in FIG. 1B, with components integrated and hosted in a networked system and operated by a single party.

System 150 receives and responds to queries from computing device 140 (e.g., client computing devices 107 or 109 as depicted in FIG. 1A) over network 103. Computing device 140 may be operated by a user and receive user input. System 150 receives and responds to queries via query manager 160. Query manager 160 may represent an Application Programming Interface (API) endpoint for which to process formatted API requests and structure API responses. As depicted in FIG. 1B, query manager 160 is integrated into LLM 170. In this example, query manager 160 may process (e.g., tokenize) a semantic query into a format (e.g., one or more tokens) which can be processed by LLM 170. Additionally or alternatively, query manager 160 may be integrated into database 180 and receive and/or respond to database queries to be executed directly on database 180. For example, query manager 160 may receive a SQL query from computing device 140, where the SQL query is to be executed directly on database 180. Query manager 160 may then receive the results of the SQL query from database 180 and send the results back to computing device 180.

LLM 170 is an artificial neural network that is embedded into database 180, with database 180 comprising a plurality of documents 182a, 182b, and 182n. LLM 170 is configured for executing semantic queries with respect to database 180. LLM 170 may be used for vectorization of database 180 by processing similar meanings and concepts across the plurality of documents 182a, 182b, and 182n in database 180. Methods for vectorization of a corpus are outside the scope of this application. LLM 170 may also be used for entity recognition with respect for database 180. LLM 170 may be based on an open-source or commercial LLM model, such as ChatGPT™ Anthropic™, LLaMa™, and/or others. LLM 170 may also be replaced with a second LLM with minimal impact to other components in system 150. LLM 170 may be replaced with a second LLM to improve accuracy, speed, privacy, identification of key concepts in a semantic query (as will be discussed with respect to FIG. 2), reduce costs and/or storage, and/or other reasons. This may provide for improvements to system 150 without lengthy and/or costly steps, such as rebuilding search vectors 175, re-training LLM 170 based on database 180, etc. Additionally or alternatively, as discussed above, LLM 170 may be external to system 150. In this example, each of computing device 140, LLM 170, and system 150 may send and/or receive queries to each other over network 103.

Search vectors 175 are a plurality of vectors (e.g., a list of floating point numbers), wherein a semantic vector represents a document, such as documents 182a, 182b, and/or 182n, in database 180. Documents with similar concepts may have corresponding vectors which are closer to each other, which may provide for those documents to be retrieved more quickly while ignoring irrelevant documents. Search vectors 175 may be generated using a third party embedding model, such as OpenAI™ embedding models. Search vectors 175 may also be organized and/or indexed by a third party model, which may be different from the model used to generate search vectors 175. Search vectors 175 may be used even when replacing LLM 170 with a second LLM. Search vectors 175 may also be re-generated and re-organized as appropriate to improve search speed and accuracy, such as: adding new documents to database 180, to leverage different embedding and/or organization models, and/or other reasons. Search vectors 175 may also be integrated into database 180.

Database 180 is a database and may be networked data storage based on one or more data servers 105. As depicted in FIG. 1B, database 180 comprises a plurality of documents 182a, 182b, and 182n. A document may be at least, but is not limited to: text files, PDFs, communications (e.g., emails, text messages, instant messages, etc.), spreadsheets, diagrams, media files (e.g., .JPG, .PNG, .MP4, etc.), and/or other types of electronically stored files. For example, in the field of e-discovery, a document is a file produced by a party in a lawsuit (or, alternatively, an electronic version of a physical production). In this example, database 180 may be used to store and analyze documents related to a lawsuit. Documents 182a, 182b, and 182n may collectively be referred to as a document corpus, wherein the plurality of documents may be available for analytics, predictive coding, and/or other methods for organizing related content within the plurality of documents. As the document corpus increases, potentially comprising thousands or millions of documents, these techniques may be more valuable to ensure queries can be executed more quickly. Database 180 may further comprise search vectors 175.

The size of database 180 is dependent on the count and types of documents 182a, 182b, and 182n. For example, a .DOCX file created in Microsoft Word could be tens or hundreds of kilobytes (KBs) in size. By contrast, an engineering diagram may be tens or hundreds of megabytes (MBs): over a thousand times larger. Higher counts of documents and larger documents both increase the size of database 180. Database 180 can be organized according to different methods to improve query execution speed, such as through vectorization. However, as the size of database 180 increases, the length of time for LLM 170 to execute a semantic query over database 180 also increases, while accuracy of the response generated by LLM 170 may decrease.

At the same time, the larger database 180 becomes, the more useful semantic queries become for searching database 180. Being able to execute a search based on concepts and meanings may spare a human user from having to evaluate individual documents to determine relevance. Improving the execution speed and efficacy of a semantic query, without excluding potentially relevant documents, can therefore be very useful when searching database 180.

FIG. 2 depicts a method for improving execution speed of a semantic query against a relevant subset of documents, according to aspects described herein. Method 200 may be implemented on system 150 as depicted in FIG. 1B. Method 200 may improve execution speed and efficacy of a semantic query against a corpus by executing the semantic query against a relevant subset of documents instead of the entire corpus.

In step 210, a semantic query, to be executed against a corpus, is received. In one example, the semantic query may be received computing device 140, as depicted in FIG. 1B, with the semantic query to be executed against database 180. In this example, a user enters the semantic query into computing device 140. As described above, a semantic query may be a natural language statement or question to be executed by an LLM, similar to LLM 170 in FIG. 1B. As one example, "Find all emails sent by John Smith" is a semantic query. A corresponding database query to "Find all emails sent by John Smith" might be "type(Email) AND emailFrom ("John Smith")," where "type" and "emailFrom" are both metadata fields in a corpus. Although both of these query examples may select the same documents in a corpus, "Find all emails sent by John Smith" can be written by a user without any database knowledge. In this first example, the semantic query may have a corresponding database query.

However, a semantic query may also express more complex concepts than may be reasonable to rewrite as a database query. In a second example, a semantic query might be "What did John Smith tell other parents about his daughter's elementary school teacher?" Without already knowing who "other parents" could refer to (i.e., the recipients) or the name of the elementary school teacher (i.e., topic), it might be difficult for a user to write a database query that identifies communications from John Smith that meet the criteria of this example semantic query. Instead, the user may have to run several database queries to first identify the different concepts in the semantic query before being able to execute a comparable database query—at which point the user would still need to analyze individual documents before being able to answer the question. Depending on the size of database 180, it may be very difficult and/or time-consuming for a user to manually search and review enough documents to answer a given semantic query with confidence.

In step 220, a first prompt is based on the semantic query. The first prompt may comprise directions to the LLM (e.g., LLM 170) to identify one or more key concepts in the semantic query. The first prompt may be generated by string interpolation, concatenation, or other known methods for combining strings. In one example, the first prompt may be generated by computing device 140, which sends the first prompt to query manager 160 to be executed by LLM 170. In another example, the computing device may send the semantic query to query manager 160, which generates the first prompt to be executed by LLM 170.

Figure 4:
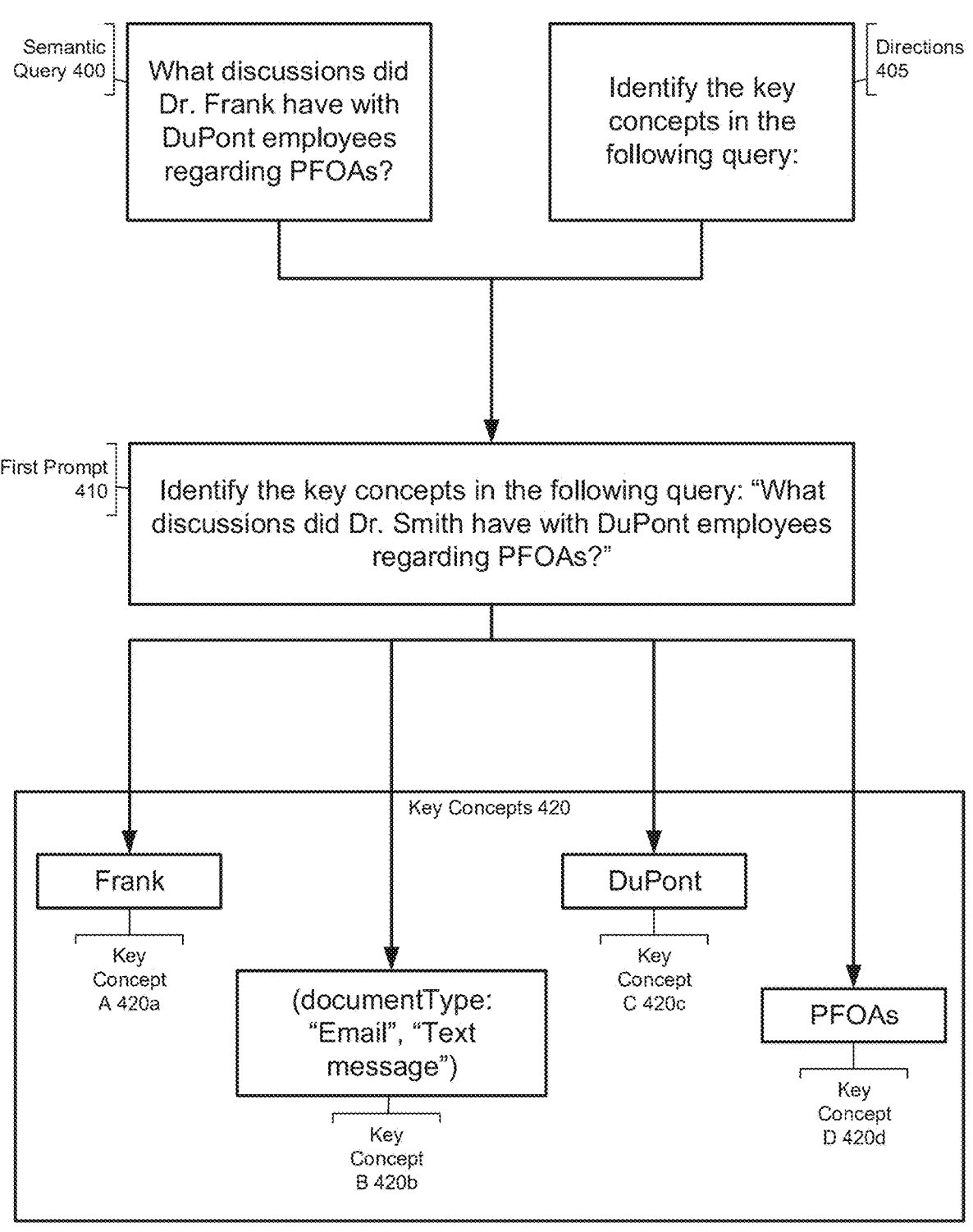
FIG. 4 depicts an example of a semantic query with one or more key concepts identified.

For example, FIG. 4 depicts a semantic query 400 and directions 405. Directions 405 direct LLM 170 on the desired analysis; in this example, to identify the key concepts in a following query. Directions 405 may be written and stored in advance of method 200. Additionally or alternatively, directions 405 may be received via user input at computing device 140.

Combining semantic query 400 and directions 405 results in first prompt 410. Additionally or alternatively, directions 405 may comprise directions to further identify specific types of key concepts and determine parameters associated with identified key concepts, which will be discussed further below. Directions 405 may also comprise directions for other tasks to be carried out by the LLM.

Returning to FIG. 2, step 230 of method 200 has the LLM identify, in response to the first prompt, one or more key concepts in the semantic query. A key concept may be based on one or more terms in the semantic query. For example, semantic query 400 in FIG. 4 is "What discussions did Dr. Frank have with DuPont employees regarding PFOAs?" In this example, the LLM may identify key concepts 420: "Linden Frank" (key concept A 420a), "(documentType: Email)" (key concept B 420b), "DuPont" (key concept C 420C), and "PFOAs" (key concept D 420D.

In the example system 150 in FIG. 1B, LLM 170 is embedded in database 180. LLM 170 identifies the key concepts in the semantic query further based on the concepts identified in search vectors 175, based on database 180. In another example, such as when the LLM is external to database 180, the LLM may not identify the key concepts based on concepts identified in database 180. Embedding the LLM in database 180 may be preferable because an embedded LLM may be able to identify key concepts in a semantic query directed at database 180 more accurately than an external LLM.

A key concept is a concept with a corresponding representative search term (e.g., keyword or token). A corresponding representative search term may not be a term used in the semantic query or as a name referring to the key concept. For example, in semantic query 400 "What discussions did Dr. Frank have with DuPont employees regarding PFOAs?" one of the identified key concepts, key concept A 420a, is "Frank," indicating the person "Dr. Linden Frank," and have a corresponding search term of "Frank." Another key concept identified from this example is key concept E 420e, "PFOAs," which might have multiple corresponding search terms: "PFOA," or "perfluorooctanoic acid," for example. As discussed, an embedded LLM and/or vectorized corpus may improve accuracy while identifying key concepts because similar concepts may already be associated with each other. This may also improve the usefulness of the resulting filter query, as will be discussed with respect to step 270.

Identifying key concepts may also comprise identifying one or more specific types of key concepts. For example, an entity-level concept may be a key concept of an entity in the corpus, determined through entity recognition. An entity may comprise proper nouns, organizations, locations, classification codes, date/times, and/or other categories as may be useful for the corpus. Entity recognition may allow for connecting multiple terms used to refer to an entity. For example, key concept A 420*a* is "Frank," but may also comprise "Dr. Frank," "Dr. Linden Frank," or "Linden," to incorporate different terms used to refer to a same person. In another example, the "the Supreme Court of the United States" may be referred to as "the Supreme Court," "the Court," or "SCOTUS." Entity recognition may provide for linking all of these terms to "The Supreme Court of the United States," which may improve search queries by including additional relevant documents. An embedded LLM may be preferred when identifying entity-level concepts because an embedded LLM may be able to identify entity-level concepts specific to the corpus. Search vectors 175 may also be used to identify and organize key concepts in database 180 such that documents with similar concepts (e.g., "Washington, DC" and "White House") may be stored close together for quicker and more accurate retrieval.

Identifying an entity-level concept may be based on the LLM identifying a preliminary key concept corresponding to a search term (e.g., keyword or token) in the first semantic query. Based on the preliminary key concept, the LLM may then determine whether the preliminary key concept further corresponds to an entity-level concept in the corpus. If the preliminary key concept does correspond to an entity-level concept in the corpus, the LLM may replace the preliminary key concept with the corresponding entity-level concept. For example, in semantic query 400, "What discussions did Dr. Frank have with DuPont employees regarding PFOAs?", the LLM may identify "Dr. Frank" as a preliminary key concept. The LLM may then determine that "Dr. Frank" corresponds to an entity-level concept in the corpus: "Linden Frank." The LLM may then include "Linden Frank" as a key concept in key concepts 420 in place of "Frank." Additionally or alternatively, the LLM may include both the entity-level concept and the preliminary key concept in the key concepts.

Another aspect of the LLM identifying key concepts may be identifying persons and/or representatives acting on behalf of an entity. For example, semantic query 400 states "What discussions did Dr. Frank have with DuPont employees regarding PFOAs?" the LLM may identify that "DuPont" corresponds to "DuPont de Nemours, Inc.," and then further determine that a "dupont.com" domain name refers to employees and/or affiliates of "DuPont de Nemours, Inc." Additionally or alternatively, the LLM may identify an entity as overlapping with one or more other entities. For example, if Dr. Frank was associated with an email address "lfrank@dupont.com," Dr. Frank may further be associated with "DuPont de Nemours, Inc." as well.

A further aspect of the LLM identifying key concepts may be distinguishing entities that can be referred to with the same search term (e.g. keyword or token). For example, "Washington," may refer to "George Washington", "Washington, DC," or "State of Washington." Entity recognition may support the LLM identifying which "Washington" a semantic query refers to.

Vectorization may improve LLM 170's ability to identify a key concept when multiple key concepts have similar search terms because the document corpus is indexed based on concept. In turn, this may improve the performance of the filter query in method 200 by ensuring that documents related to an identified key concept are selected by the filter query while decreasing the likelihood of false positives for irrelevant key concepts with similar names (e.g., a search selecting a document for "State of Washington" rather than "Washington, DC").

A further aspect of the LLM identifying key concepts may be identifying metadata concepts (e.g., metadata recognition). A metadata concept may be a key concept that corresponds to a metadata field in the corpus. Examples of metadata fields include, for example, "Date," "Title," "Custodian," etc. Database 180 may have numerous metadata fields to assist in organizing, querying, and retrieving documents. In the field of e-discovery, documents may have highly structured metadata to support precise querying. rather than having a singular "Date" field, the corpus might have: "Created Date" (when the document was created), "Modified Date," "Sent Date" (corresponding to communications), "Received Date," "Produced Date" (referring to when a document was formally produced during a lawsuit), or others. Being able to query dates at this level of precision may be valuable for semantic queries about, for example, when parties knew a fact, when parties communicated with each other or stopped communicating with each other, etc. It will be noted that metadata recognition is known in the art.

As part of this aspect, the LLM may determine that a key concept identified from the semantic query likely corresponds to a metadata field in the corpus. For example, in the semantic query, "What discussions did Dr. Frank have with DuPont employees regarding PFOAs?", the LLM may identify a preliminary key concept of "discussions" and that "discussions" likely corresponds to metadata field "documentType" in the corpus. The "documentType" field may have several metadata values, including, for example, "Word," "Excel," "Email," "Text message," and/or others. The LLM may further determine that the relevant metadata values for the "discussions" key are the "Email" and/or "Text message" values in "documentType." Based on this determination, the LLM may include, as key concept B 420*b*, "(documentType: "Email", "Text message")," which may be an executable database query which would only select documents in the corpus with a document type of "Email" or "Text message". Including a metadata query may further support selecting a relevant subset of documents from the corpus. Additionally or alternatively, the LLM may include the preliminary key concept in the key concepts.

In step 240, one or more selection parameters for each of the key concepts may be determined. Selection parameters for the key concepts may be determined by computing device 140, by system 150, and/or both. A selection parameter indicates an aspect of an associated key concept with respect to the semantic query and/or the corpus. Selection parameters may be used to selection more relevant key concepts for the subset of documents.

Different selection parameters can be calculated. For example, according to some aspects the selection parameters can include: a count of documents or other count parameter indicating frequency within the corpus, an essentialness parameter, a metadata parameter, and/or any other suitable parameter. Several exemplary selection parameters are described further below, though any suitable selection parameters for evaluating the use of a concept in reducing the document set to be searched may be used according to the aspects described herein.

A count parameter may correspond to a frequency of the first key concept in the plurality of documents. Frequency may be defined by one or more different methods. For example, frequency may refer to a number of documents in the corpus comprising the key concept (e.g., a database count). In this example, the count parameter may be obtained by querying the plurality of documents for a number of documents comprising the key concept. The count parameter may be represented as, but not limited to:

a number, a relative indicator (e.g., "large," "medium," "small"), and/or other representations. Additionally or alternatively, the count parameter may refer to a frequency of the key concept in the corpus. Additionally or alternatively, other metrics for determining the count parameter may be available based on the architecture and/or platform hosting the corpus.

An essentialness parameter may be based on a likelihood that a document exists in the plurality of documents which is relevant to the semantic query and does not comprise the first key concept. The LLM may predict an essentialness parameter for a key concept based on a second prompt. For example, looking to FIG. 4, an essentialness prompt (constructed similarly first prompt 410 in FIG. 4) might state "Based on the semantic query, "[semantic query 400]", determine how essential each of the following key concepts is to the semantic query: [key concepts 420]." Additionally or alternatively, the LLM may predict essentialness based on separate prompts for each key concept. For example, a prompt to determine the essentialness of key concept A 420a might state "Determine the essentialness of [key concept A 420a] to semantic query, "[semantic query 400]." In another aspect, directions 405 in FIG. 4 might further comprise directions to determine the essentialness of the identified key concepts. For example, directions 405 may comprise directions to identify documents based on real-world criteria, such as "Identify documents likely to be produced by the plaintiff in this case." Using directions 405 to provide specific criteria for essentialness may be preferred due to the ease in which directions 405 may be modified compared to modifying or training the LLM. The essentialness parameter may be represented as a number (e.g., percentage) indicating a relative essentialness, as a predefined option within a set of options indicating general levels of essentialness (e.g., "highly essential," "essential," "likely not essential"), and/or others.

When determining an essentialness parameter, an embedded LLM (such as embedded LLM 170 and database 180 as depicted in FIG. 1B) may be preferred. An embedded LLM may be further trained on the corpus such that the embedded LLM has improved recognition of key concepts specific to the corpus. Because the embedded LLM has improved recognition of key concepts in the corpus and can evaluate documents in the corpus, the embedded LLM may be able to make more accurate determinations of essentialness compared to an external LLM. An external LLM may not be trained on the corpus and/or may not have access to the corpus. As a result, an external LLM may not be able to determine essentialness as accurately. An external LLM may be better at determining essentialness when essentialness based on directions 405 in prompt 410 compared to an external LLM determining essentialness based on database 180.

In step 250, one or more keyword queries may be generated based on the key concepts and search operators. A keyword query may be an executable database statement (e.g., database query) comprising at least one key concept and at least one search operator. A search operator may be a database query operator such as AND, OR, NOT, proximity operators, and/or other common search operators. A keyword query may select a smaller subset of documents corresponding to the at least one key concept while ensuring that the smaller subset still comprises relevant documents, providing for the semantic query to be executed more quickly without sacrificing accuracy. A method for generating a keyword query is depicted in FIG. 3.

Figure 3:
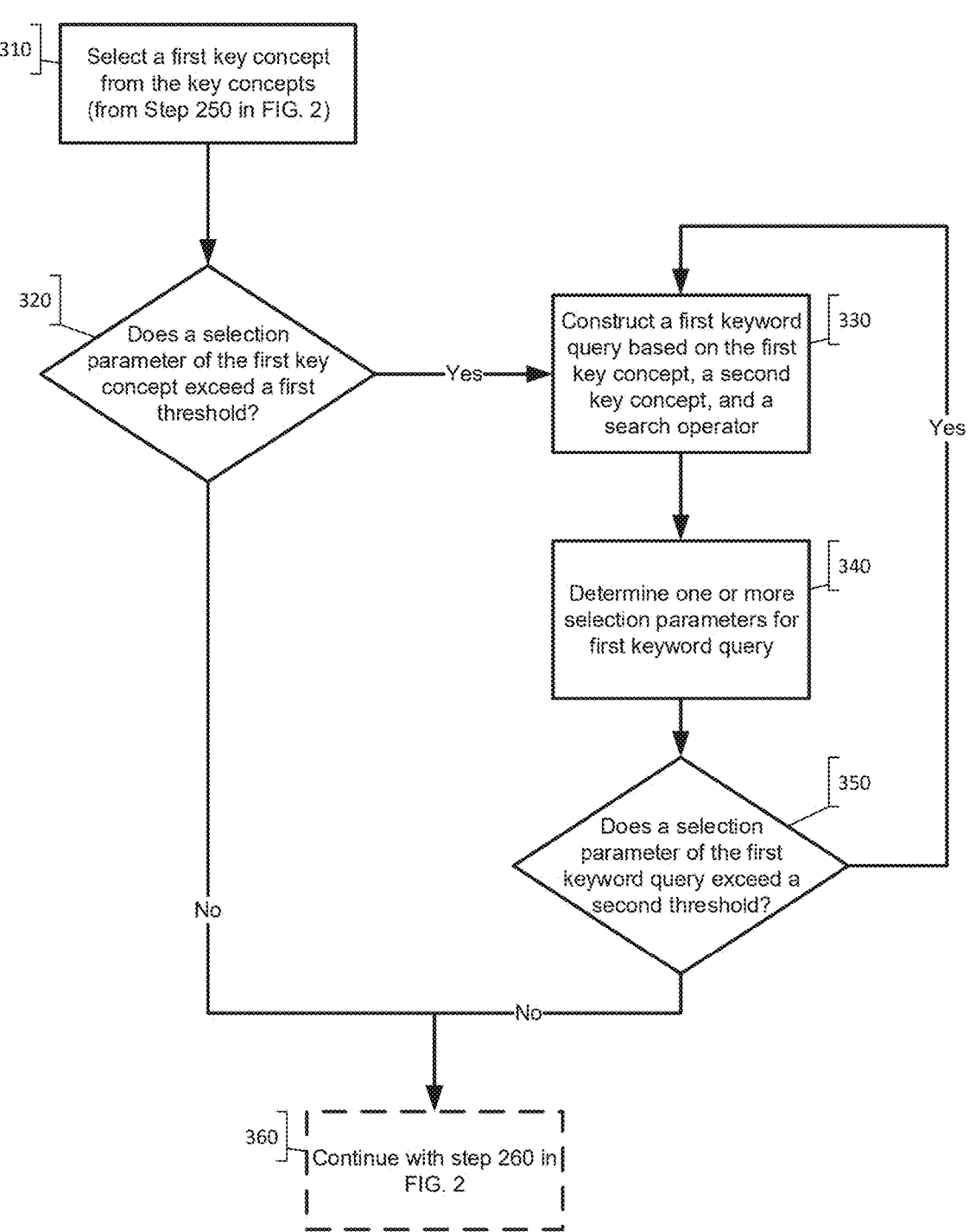
FIG. 3 depicts a method for generating one or more keyword queries according to aspects described herein.

FIG. 3 depicts a method for generating a keyword query according to aspects described herein. Method 300 depicted in FIG. 3 may be repeated to generate additional keyword queries. In the example depicted in FIG. 3 and described further below, the count parameter may be used to evaluate a first key concept, determine if a first keyword query should be built based on the first key concept, and build a first keyword query. Additionally or alternatively, other selection parameters may be used.

In step 310, a first key concept is selected from the key concepts. The key concepts may be obtained by generating a prompt and, based on the prompt, directing an LLM to identify key concepts in a semantic query, similar to steps 220 and 230 in FIG. 2 and further depicted in FIG. 4. The first key concept may be associated with one or more selection parameters, which may be determined by the process described in step 240 in FIG. 2.

In step 320, a first selection parameter associated with the first key concept may be evaluated to determine whether the first selection parameter exceeds a first threshold. Based on the first selection parameter exceeding the first threshold, a first keyword query may be generated based on the first key concept. Additionally or alternatively, one or more selection parameters may be evaluated.

For example, the selection parameter to determine whether to generate a keyword query may be the count parameter. If the count parameter for the first key concept exceeded a first threshold of 10,000, system 150 may generate a first keyword query based on the first key concept.

The first keyword query may be built such that the first keyword query has an associated count parameter below the first threshold. One or more thresholds may be defined. Additionally or alternatively, other selection parameters may be used to determine whether to generate a keyword query.

Based on the selection parameter associated with the first key concept not exceeding a first threshold, a keyword query may not be generated for the first key concept. In this case, the system 150 may continue to step 360, as will be described further below.

Based on the selection parameter associated with the first key concept exceeding a first threshold, a first keyword query may be built based on the first key concept according to method 300. The steps for building the first keyword query may be depicted below in steps 330-350 in FIG. 3.

In step 330, the first keyword query may be constructed based on the first key concept, a second key concept, and a search operator. The second key concept may be selected from the key concepts, such as key concepts 420 depicted in FIG. 4. The first keyword query may be built by connecting the first key concept and second key concept with a search operator.

Depending on the selection parameter and the first threshold, the first keyword query may be built based on one or more predefined methods. According to an aspect, where the count parameter associated with the first key concept exceeds a first threshold of 10,000, the first keyword query may be built by connecting the first key concept and a second key concept with an "AND" operator. As a result, a count parameter associated with the first keyword query is likely to have a lower count than the count parameter associated with the first key concept. At the same time, because the first keyword query is based on key concepts, the first keyword query will select documents relevant to the semantic query.

According to another aspect, the first keyword query may be built based on a selection parameter falling below the first threshold. For example, if the count parameter associated with the first key concept fell below a first threshold of 50, the first keyword query may be built such that the first keyword query has a count parameter above the first threshold. In this example, the first key concept may be combined with a term outside of the key concepts for the purpose of including additional relevant documents. For example, a query for "Mark Adams" may have a very low count because "Mark Adams" may be referred to as "Mark" only. In this example, "Mark Adams" may be connected with "Mark" and an OR operator to capture additional relevant documents.

Additionally or alternatively, if the first keyword query selects documents which are not relevant to the semantic query, the keyword query may be further combined with a "NOT" operator to exclude irrelevant terms. To use the "Mark Adams" example above, a third keyword query of ("Mark Adams" OR "Mark") may include documents referring, for example, a "Mark Burger," which is irrelevant to the semantic query. Relevancy may be determined by, for example, sending the first keyword query to the LLM to evaluate how many documents selected by the first keyword do not correspond with the first key concept. In this example, the third keyword query may be further combined with a "NOT" operator to exclude "Burger": for example, ("Mark Adams" OR "Mark") AND NOT "Mark Burger"). Additionally or alternatively, other search operators and combinations may be used.

In step 340, one or more selection parameters may be determined for the first keyword query. Selection parameters may be similar to the selection parameters associated with a key concept, as described with respect to step 240 in FIG. 2. Selection parameters associated with the first keyword may be based on selection parameters associated with the first key concept and/or additional key concepts which the keyword query is based on. For example, the first keyword query may have an essentialness parameter based on an essentialness parameter of the first key concept. Additionally or alternatively, a selection parameter may be re-determined for the first keyword query. For example, a count parameter for the first keyword query may be determined by querying the plurality of documents for a count associated with the first keyword query.

In step 350, a first selection parameter of the first keyword query may be evaluated to determine whether the first selection parameter exceeds a second threshold. The second threshold may be the same as the first threshold in step 320. Based on the first selection parameter of the first keyword query exceeding a second threshold, steps 330-350 may be repeated to update the first keyword query until the first selection parameter of the first keyword does not exceed the second threshold. For example, if the first keyword query was generated by connecting the first key concept and second key concept with an "AND" operator, the "AND" operator may be changed to a proximity operator to further reduce a count associated with the first keyword query. Additionally or alternatively, the first keyword query may be updated by adding an additional key concept and search operator, changing a search operator (e.g., changing an "AND" to a proximity operator), narrowing a proximity operator, and/or other methods to optimize the first selection parameter.

Based on the first selection parameter of the first keyword query not exceeding the second threshold, the first keyword query may be finalized in step 360. The first keyword query may then be used in step 260 in FIG. 2. Method 300 may be repeated for other key concepts in the key concepts. A key concept may be used in more than keyword query. As an example, the first key concept might be key concept A 420a in FIG. 4, and the first keyword query based on key concept A 420A is "[key concept A 420a] AND [key concept B 420b]." Method 300 may then be applied to key concept B 420b, wherein key concept B 420b is the first key concept as described throughout method 300.

Returning to step 260 in FIG. 2, a filter query may be generated by selecting one or more filter terms from the key concepts and the keyword queries based on the corresponding selection parameters. A filter term may refer to either a key concept (e.g., key concepts 420 in FIG. 4) or a keyword query (e.g., built with method 300 in FIG. 3). The filter query may be an executable database statement. The filter query may be generated by connecting one or more filter terms with one or more search operators. For example, the filter query may be generated by connecting one or more filter terms with an "OR" operator. Additionally or alternatively, other search operators may be used to optimize the filter query for a given filter term or a selection parameter. For example, if the filter query is built to prioritize essentialness, filter terms with a corresponding essentialness parameter indicating high essentialness may be combined with an "OR" operator, while less essential filter terms may be combined with an "AND" operator. An effect of the filter query is to select a subset of relevant documents from the corpus to improve execution speed of the semantic query.

One method of selecting the filter terms based on the selection parameters may be to build the filter query with a count close to a specified target count parameter. For example, the filter query may have a target count parameter of 10,000, wherein a filter query meets the target count parameter by having a count parameter within 1,000. A count parameter for the filter query may be determined by selecting an additional filter term, adding up the corresponding count parameter for the selected filter term to the filter query count parameter, and repeating until the filter query count parameter meets the target count parameter. The count parameter may be determined after connecting each subsequent filter term. For example, the count parameter may be determined for a filter query of "(John Smith)" then determined against for "(John Smith) OR ("Jamestown Elementary School" AND "McDonald")," and so forth. The count parameter for the filter query may also be determined by querying the database hosting the plurality of documents with the (e.g., a COUNT(query in SQL).

The target count parameter may be further based on aspects of the database, such as a number of documents, storage required, and/or other features. Additionally or alternatively, the target count parameter may be based on aspects of the search vectors. For example, when the search vectors have a very strong correlation between distance between vectors and relevance of documents corresponding to said vectors, the target count parameter may be higher to allow for more relevant documents. However, if the search vectors have a higher rate of false positives (e.g., vectors which are close together, but with corresponding documents which would not be considered similar by a human), the target count parameter may be lowered to keep out irrelevant documents. The target count parameter may be further adjusted based on updates to the search vectors.

Additionally or alternatively, a first filter term may be prioritized based on a corresponding selection parameter. For example, a first filter term with a high essentialness parameter may be connected to the filter query before a second filter term with a low essentialness parameter. In this method, a filter term which is more likely to be essential to the semantic query may be included in the filter query, while a less essential filter term may not be included.

In one aspect, filter terms may be connected to the filter query until the filter query meets the target count parameter. In another aspect, filter terms may be connected to the filter query until all of the key concepts identified in step 230 (e.g., key concepts 420 in FIG. 4) are included, either as the key concept or in a keyword query, in the filter query. Other metrics for finalizing the filter query may also be used.

Figure 5:
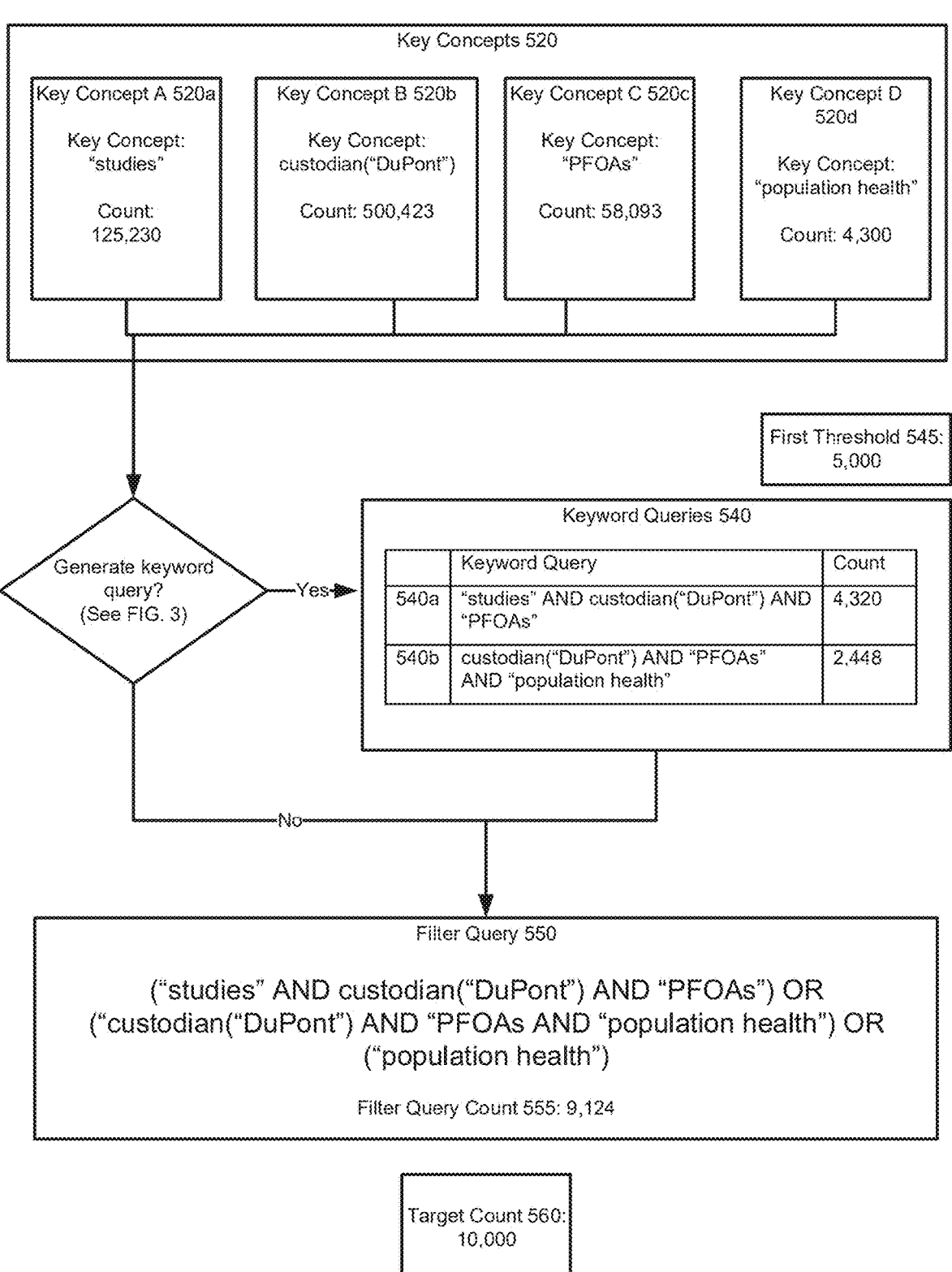
FIG. 5 depicts an example of a filter query, generated by selecting one or more filter terms from one or more key concepts and one or more keyword queries.

FIG. 5 depicts an example of a filter query generated based on the process described in step 260 in FIG. 2. In the example depicted in FIG. 5, the semantic query is, "What studies did DuPont conduct regarding the effects of PFOAs on population health?" This semantic query may not be depicted in FIG. 5 to focus on the steps for generating the filter query. In this example, key concepts 520 have been identified from the semantic query, comprising key concept A 520*a*, key concept B 520*b*, key concept C 520*c*, and key concept D 520*d*. Key concepts 520 may be identified through a process similar to that described with respect to steps 220 and 230 in FIG. 2 and with respect to key concepts 420 identified from semantic query 400 in FIG. 4.

Key concepts 520 each may have one or more selection parameters corresponding to each key concept. As depicted in FIG. 5, the selection parameters comprise at least count parameters corresponding, respectively, to key concept A 520*a*, key concept B 520*b*, key concept C 520*c*, and key concept D 520*d*. The count parameters may be determined through a process similar to that described with respect to step 240 in FIG. 2, such as by querying the plurality of documents for a count based on the corresponding key concept. Additionally or alternatively, although not depicted in the example in FIG. 5, additional selection parameters may also be determined for key concepts 520.

Filter query 550 may be generated by selecting one or more filter terms from key concepts 520 and keyword queries 540. Keyword queries 540 may be generated using method 300 as depicted in FIG. 3, based on comparing corresponding count parameters to first threshold 545 (5,000). For example, key concept D 520D, "population health" has a count parameter of 4,300, which is less than first threshold 545. As a result, a keyword query may not be generated based on key concept D 520*d*.

Key concept A 520*a*, "studies", has a count parameter of 125,230, which is more than first threshold 545. Keyword 540*a* may be generated by connecting key concept A 520*a* with key concept B 520*b* and key concept C 520*c* with two "AND" search operators. This process may be similar to steps 330-350 described in FIG. 3. As described in FIG. 3, an initial keyword query may be updated to add additional key concepts (key concept B 520*b* and key concept C 502*c*) based on a count parameter of the initial keyword query exceeding the first threshold.

Similarly, key concept B 520*b* also has a count parameter over first threshold 545. Key concept B 520*b* is also a metadata query, custodian("DuPont"), and may have been identified by the LLM as a metadata concept based on "what studies did DuPont conduct," suggesting that documents related to the studies would have been in DuPont's possession and produced by DuPont during a lawsuit. For key concept B 520*b*, keyword query 540*b* may be generated by connecting key concept B 520*b* with key concept C 520*c* and key concept D 520*d*.The corresponding count for keyword query 540*b* may be 2,448, which is below first threshold 545.

Filter query 550 may be generated by selecting, as filter terms from key concepts 520 and keyword queries 540.

Target count 560 may be a target count for filter query 550, representing a target count for the subset of documents. Filter query count parameter 555 may be determined through methods similar to those described with respect to the count parameter for the key concepts, in step 240 in FIG. 2, or for the keyword queries, in step 340 in FIG. 3. Additionally or alternatively, target parameters corresponding to other selection parameters may be used. For example, a target essentialness parameter may be set at "essential," such that each filter term in the filter query has at least an essentialness parameter of "essential."

In another aspect, steps 250 and 260 may be combined. In this aspect, the filter query may be generated by selecting a first key concept from the key concepts for the filter query, potentially generating a keyword query based on the first key concept using method 300 in FIG. 3, and then connecting the keyword query to the filter query. The process may then be repeated until the filter query has a count parameter within range of the target count.

For example, using key concepts 520 to illustrate this aspect, building the filter query may begin by selecting key concept A 520*a*. Because key concept A 520*a* has a count parameter exceeding first threshold 545, a keyword query may be built based on key concept 520*a*. The keyword query may be built using method 300 to connect one or more key concepts to key concept A 520*a* until the keyword query has a count parameter less than first threshold 545. For example, ("studies" AND custodian("DuPont")) may have a count parameter of 9,882, which still exceeds first threshold 545. Based on method 300, an additional key concept may be added to further reduce the count parameter of the keyword query. After adding key concept C 520*c*, resulting in ("studies" AND custodian("DuPont") AND "PFOAs"), the count parameter is 4,320, which does not exceed first threshold 545. The keyword query may then be added to filter query 550, which may now comprise ("studies" AND "custodian ("DuPont") AND "PFOAs").

At this time, filter query 550 may have a count parameter outside of range of target count 560 (i.e., a count parameter of 4,320, corresponding to the keyword query based on key concept A 520*a*). Based on filter query 550 having a count parameter below target count 560, a second key concept may be selected from key concepts 520. The process may then repeat until filter query 550 has a count parameter within range of target count 560.

In step 270, the system selects a subset of documents from the corpus by executing the filter query on the corpus. The filter query identifies and/or retrieves the subset of documents that the semantic query will be executed against. The subset of documents comprises documents which are relevant to the key concepts, identified from the semantic query in step 230 in FIG. 2, while omitting documents which are not relevant to the key concepts. The filter query may be executed on the corpus using known methods for executing a traditional database query. As a result, the semantic query can be executed more quickly and/or with fewer computing resources against the subset of documents without sacrificing accuracy.

In step 280, the semantic query may be executed against the subset of documents selected by the filter query. The semantic query may be executed by LLM 170 against the subset of documents in database 180. In another example, such as when an external LLM is used to determine the key concepts, the semantic query may be executed by query manager 160 or and/or other database model against database 180. Executing the semantic query against the subset of documents rather than the plurality of documents may improve the speed or accuracy of the semantic query because irrelevant documents may be excluded. Because semantic queries may take a long time to execute, especially over large databases, this method may improve the execution speed when using a semantic query to search a plurality of documents. This method may also improve accuracy of a semantic query by executing the semantic query against documents which are likely to be relevant to the semantic query, reducing a chance that LLM 170 may answer the semantic query based on irrelevant documents. Additionally or alternatively, either or both of step 270 and step 280 may be executed from the LLM, based on the computing device directing the LLM to execute the semantic query against a subset of documents selected by the filter query. In this example, the filter query may be sent to the LLM in a prompt, similar to how first prompt 410 from FIG. 4 is constructed and executed based on method 200.

In step 290, results of the first semantic query, based on the subset of documents, may be received. A format of the results may vary depending on the first semantic query. For example, if the first semantic query asked a question about a series of communications between two parties, the results may be a natural language summary of the relevant communications. In another example, if the first semantic query directed the LLM to identify a series of communications between two parties, the results may be a list of the relevant documents. In this example, the results may also comprise the relevant documents themselves.

Other implementations may also be possible. For example, when one or more key concepts are non-essential (e.g., have a low essentialness parameter), non-essential key concepts may be omitted from the filter query. In this example, downstream vector search (e.g., based on search vectors 175) may be used to retrieve more documents from the database, based on vector distance, to compensate for key concepts omitted from the filter query.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

We claim:

1. A computing method, comprising:
receiving, at a computing device and via a network, a first semantic query to be executed against a document corpus, wherein the document corpus comprises a plurality of documents;
based on the computing device receiving the first semantic query, generating a filter query, wherein generating the filter query comprises:
generating, by the computing device, a first prompt based on the first semantic query, wherein the first prompt is configured to direct a large language model (LLM) to identify one or more key concepts in the first semantic query;
submitting, to a first LLM, the first prompt;
identifying, based on the first LLM executing and in response to the first prompt and based on the document corpus, one or more key concepts in the first semantic query;
determining, by the computing device and for each key concept of the key concepts, one or more selection parameters corresponding to each key concept and based on the document corpus, wherein:

20 the selection parameters corresponding to each key concept comprise at least a count parameter, wherein the count parameter is based on a frequency of each key concept in the document corpus;
generating, by the computing device, one or more keyword queries,
wherein a keyword query of the keyword queries is based on at least one key concept and at least one search operator; and
determining, by the computing device and for each keyword query of the keyword queries, one or more selection parameters based on the document corpus, wherein the selection parameters corresponding to each keyword query comprise at least a count parameter;
generating, by the computing device, the filter query by selecting one or more filter terms from the key concepts and the keyword queries, based at least in part on the count parameter corresponding to each respective filter term;
selecting, by the computing device, via the network and using the filter query, a subset of documents in the document corpus;
executing, by the computing device and via the network, the first semantic query against the subset of documents; and
receiving, at the computing device, results of the first semantic query executed against the subset of documents.

2. The method of claim 1, wherein generating the filter query further comprises:
selecting one or more filter terms for the filter query;
determining a count parameter corresponding to the filter query; and based on the count parameter corresponding to the filter query not exceeding a target count, selecting one or more additional filter terms for the filter query.

3. The method of claim 1, wherein the count parameter for a given key concept is a number of documents in the document corpus comprising the given key concept.

4. The method of claim 1, wherein a keyword query based on a first key concept is generated by:
determining, based on the count parameter associate corresponding with the first key concept, that the count parameter exceeds a first threshold;
selecting, from the key concepts, a second key concept; and
connecting the first key concept and second key concept with a search operator.

5. The method of claim 1, wherein the selection parameters further comprise an essentialness parameter, and wherein selecting the one or more filter terms for the filter query is further based on:
comparing the essentialness parameter corresponding to each respective filter term; and
based on the essentialness parameter corresponding to a respective filter term indicating that the respective filter term has a high degree of essentialness, selecting the respective filter term.

6. The method of claim 5, wherein determining the selection parameters for a respective key concept further comprises:
identifying, using the first LLM, the essentialness parameter corresponding to respective key concept; and wherein essentialness is based on a likelihood that a document in the document corpus is relevant to the first semantic query and does not correspond to the respective key concept.

7. The method of claim 1, wherein identifying the key concepts further comprises:

predicting, using the first LLM, a likelihood that a first key concept corresponds to a first metadata field in the document corpus;

based on a high likelihood that the first key concept corresponds to the first metadata field, generating, using the first LLM, a first metadata query corresponding to the first key concept and the first metadata field; and wherein the key concepts include the first metadata query.

8. The method of claim 1, wherein identifying the one or more key concepts in the first semantic query further comprises:

identifying, by the first LLM, a first term in the first semantic query;

determining, by the first LLM, that the first term corresponds to a first entity level concept; and including the first entity level concept in the key concepts.

9. The method of claim 8, wherein an entity level concept comprises a plurality of key concepts referring to a same entity.

10. The method of claim 8, wherein the first entity level concept is a person.

11. The method of claim 1, wherein a first keyword query based on a first key concept is configured to exclude one or more negative keywords, and wherein a negative keyword is a first keyword appearing in one or more documents in the document corpus which the first key concept also appears in and wherein the first keyword is not relevant to the first semantic query.

12. The method of claim 1, wherein a search operator comprises one of:

an AND operator;

an OR operator;

a NOT operator; or a proximity operator.

13. The method of claim 1, wherein building the filter query further comprises:

selecting one or more filter terms for the filter query;

determining a count parameter corresponding to the filter query; and based on the count parameter exceeding a target count:

selecting one or more additional filter terms for the filter query, and adding the one or more additional filter terms to the filter query with an AND operator.

14. A non-transitory computer readable medium having instructions stored thereon that, when executed by a computing device comprising one or more processors, cause the computing device to perform steps comprising:

receiving, at the computing device and via network, a first semantic query to be executed against a document corpus, wherein the document corpus comprises a plurality of documents;

based on the computing device receiving the first semantic query, generating a filter query, wherein generating the filter query comprises:

generating, by the computing device, a first prompt based on the first semantic query, wherein the first prompt is configured to direct a large language model (LLM) to identify one or more key concepts in the first semantic query;

submitting, to a first LLM, the first prompt;

identifying, based on the first LLM executing and in response to the first prompt and based on the document corpus, one or more key concepts in the first semantic query;

determining, by the computing device and for each key concept of the key concepts, one or more selection parameters corresponding to each key concept and based on the document corpus, wherein:

the selection parameters comprise at least a count parameter, wherein the count parameter is based on a frequency of each key concept in the document corpus;

generating, by the computing device, one or more keyword queries, wherein a keyword query of the keyword queries is based on a key concept and at least one search operator; and determining, by the computing device and for each keyword query of the keyword queries, one or more selection parameters based on the document corpus, wherein the selection parameters corresponding to each keyword query comprise at least a count parameter;

generating, by the computing device, the filter query by selecting one or more filter terms from the key concepts and the keyword queries, based at least in part on the count parameter corresponding to each respective filter term;

selecting, by the computing device, via the network an using the filter query, a subset of documents in the document corpus;

executing, by the computing device and via the network, the first semantic query against the subset of documents; and receiving, at the computing device, results of the first semantic query executed against the subset of documents.

15. The non-transitory computer readable medium of claim 14, wherein generating the filter query further comprises:

selecting one or more filter terms for the filter query;

determining a count parameter corresponding to the filter query; and based on the count parameter corresponding to the filter query not exceeding a target count, selecting one or more additional filter terms for the filter query.

16. The non-transitory computer readable medium of claim 14, wherein the selection parameters further comprise an essentialness parameter, and wherein selecting the one or more filter terms for the filter query is further based on:

comparing the essentialness parameter corresponding to each respective filter term; and based on the essentialness parameter corresponding to a respective filter term indicating that the respective filter term has a high degree of essentialness, selecting the respective filter term.

17. The non-transitory computer readable medium of claim 14, wherein building the filter query further comprises:

selecting one or more filter terms for the filter query;

determining a count parameter corresponding to the filter query; and based on the count parameter exceeding a target count:

selecting one or more additional filter terms for the filter query, and adding the one or more additional filter terms to the filter query with an AND operator.

18. A computing device, comprising:

one or more processors; and memory storing instructions that, when executed by the one or more processors, cause the computing device to:

receive, at the computing device and via a network, a first semantic query to be executed against a document corpus;

based on the computing device receiving the first semantic query, generating a filter query, wherein generating the filter query comprises:

generating, by the computing device, a first prompt based on the first semantic query, wherein the first prompt is configured to direct an LLM to identify one or more key concepts in the first semantic query;

submitting, to a first LLM, the first prompt;

identifying, based on the first LLM executing and in response to the first prompt and based on the document corpus, one or more key concepts in the first semantic query;

determine, by the computing device and for each key concept of the key concepts, one or more selection parameters corresponding to each key concept and based on the document corpus, wherein:

the selection parameters corresponding to each key concept comprise at least a count parameter based on a frequency of each key concept in the document corpus;

generate, by the computing device, one or more keyword queries, wherein a keyword query of the keyword queries is based on a key concept and at least one search operator; and determine, by the computing device and for each keyword query of the keyword queries, one or more selection parameters based on the document corpus, wherein the selection parameters corresponding to each keyword query comprise at least a count parameter;

generate, by the computing device, the filter query by selecting one or more filter terms from the key concepts and the keyword queries, based at least in part on the count parameter corresponding to each respective filter term;

select, by the computing device, via the network, and using the filter query, a subset of documents in the document corpus;

execute, by the computing device and via the network, the first semantic query against the subset of documents; and receive, at the computing device, results of the first semantic query executed against the subset of documents.

19. The computing device of claim 18, wherein the memory storing instructions that, when executed by the one or more processors, further cause the computing device to generate the filter query by:

selecting one or more filter terms for the filter query;

determining a count parameter corresponding to the filter query; and based on the count parameter corresponding to the filter query not exceeding a target count, selecting one or more additional filter terms for the filter query.

20. The computing device of claim 18, wherein the selection parameters further comprise an essentialness parameter, and the memory storing instructions that, when executed by the one or more processors, further cause the computing device to select the one or more filter terms by:

comparing the essentialness parameter corresponding to each respective filter term; and based on the essentialness parameter corresponding to a respective filter term indicating that the respective filter term has a high degree of essentialness, selecting the respective filter term.

* * * * *